(12) United States Patent
Heritier et al.

(10) Patent No.: US 8,011,391 B2
(45) Date of Patent: Sep. 6, 2011

(54) END PROTECTOR DEVICE FOR TUBULAR STRUCTURES

(75) Inventors: Luis Roberto Heritier, Buenos Aires (AR); Hugo Alejandro Ernst, Buenos Aires (AR); Matías Gustavo Pereyra, Buenos Aires (AR)

(73) Assignee: Siderca S.A.I.C., Buenos Aires (AR)

( * ) Notice: Subject to any disclaimer, the term of this patent is extended or adjusted under 35 U.S.C. 154(b) by 9 days.

(21) Appl. No.: 12/195,983

(22) Filed: Aug. 21, 2008

(65) Prior Publication Data

US 2009/0050230 A1 Feb. 26, 2009

(30) Foreign Application Priority Data

Aug. 21, 2007 (AR) ................................ P070103692

(51) Int. Cl.
*B65D 59/06* (2006.01)
(52) U.S. Cl. .................. 138/96 R; 138/96 T; 220/256.1; 220/789; 220/801
(58) Field of Classification Search ................ 138/96 R, 138/96 T; 220/256.1, 789, 795, 800, 801, 220/804
See application file for complete search history.

(56) References Cited

U.S. PATENT DOCUMENTS

| | | | | |
|---|---|---|---|---|
| 1,049,752 A * | 1/1913 | McMurtrie | ..................... | 174/82 |
| 2,195,530 A * | 4/1940 | Curtis | ........................... | 138/96 T |
| 2,212,423 A * | 8/1940 | Lytle | ............................. | 138/96 T |
| 2,608,201 A * | 8/1952 | Henry | ......................... | 137/68.23 |
| 3,911,960 A * | 10/1975 | Flimon | ....................... | 138/96 R |
| 4,185,665 A * | 1/1980 | Flimon | ........................... | 138/89 |
| 4,487,228 A * | 12/1984 | Waldo et al. | ................. | 138/96 T |
| 4,655,256 A * | 4/1987 | Lasota et al. | ................. | 138/96 T |
| 4,869,293 A * | 9/1989 | Botsolas | ..................... | 138/96 R |
| 5,244,015 A * | 9/1993 | Dreyfuss et al. | ............. | 138/96 T |
| 5,718,454 A * | 2/1998 | Harrod | ........................ | 280/756 |
| 6,135,156 A * | 10/2000 | Donoho et al. | ................. | 138/89 |
| 7,281,546 B2 * | 10/2007 | Goodson et al. | ............. | 138/96 T |
| 7,404,419 B2 * | 7/2008 | Gonzalez et al. | ............ | 138/96 T |
| 2005/0166985 A1 * | 8/2005 | Brown et al. | ................. | 138/96 R |
| 2005/0166986 A1 * | 8/2005 | Dell'erba et al. | ............ | 138/96 T |
| 2007/0113910 A1 | 5/2007 | Pagura et al. | | |

* cited by examiner

*Primary Examiner* — James F Hook
(74) *Attorney, Agent, or Firm* — Knobbe, Martens, Olson & Bear, LLP

(57) ABSTRACT

A protector device for the ends of the tubular goods, such as tubes for the oil industry, OCTG, line pipes and the like is provided. The protector device may include two pieces, a generally elongate protector body and a bumper reinforcement that may be reversibly connected to the protector body. The protector body may be configured in a cylindrical geometry having a first end and a second end interconnected by lateral walls and defining a socket. The second end of the body further comprises a shoulder and an opening defining a socket in which a tubular good may be inserted. The bumper reinforcement includes an external curved or conical surface, capable of deforming in reaction to an external force in order to protect an enclosed tubular good.

23 Claims, 3 Drawing Sheets

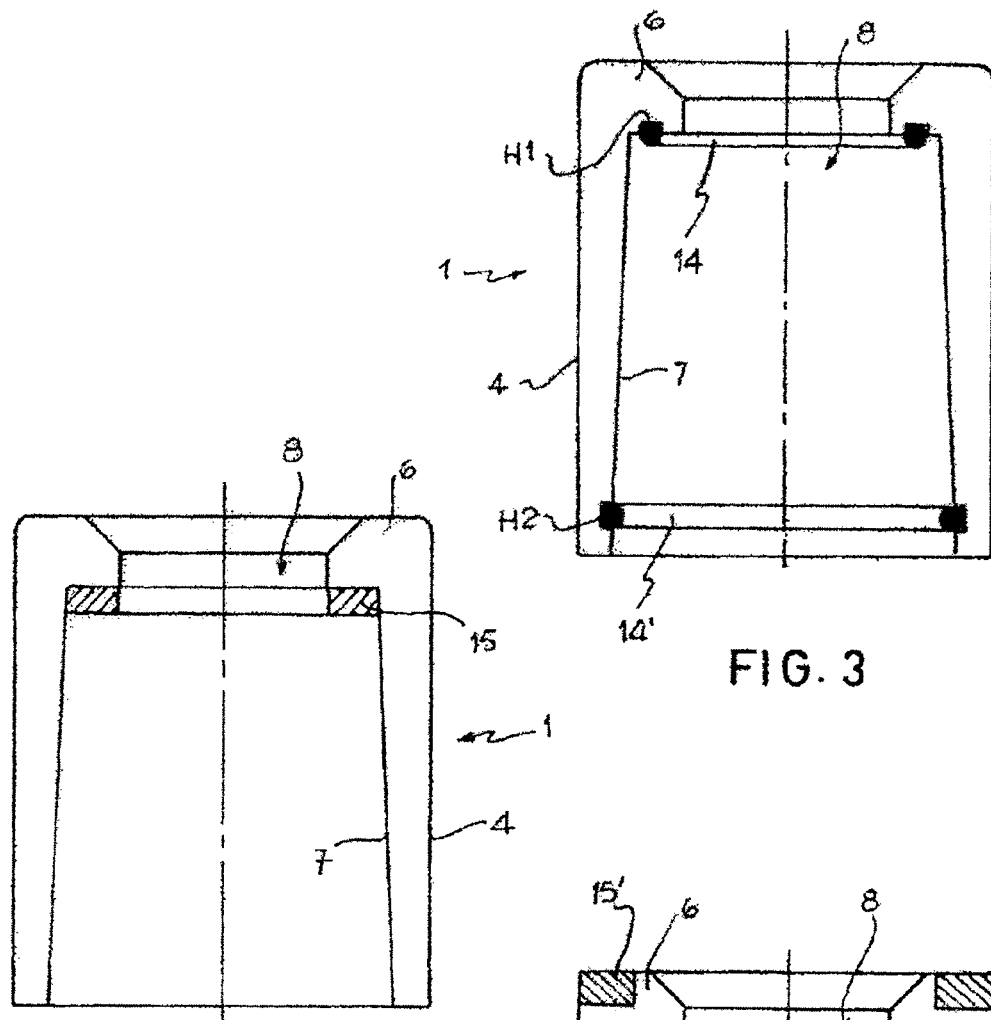
FIG. 3
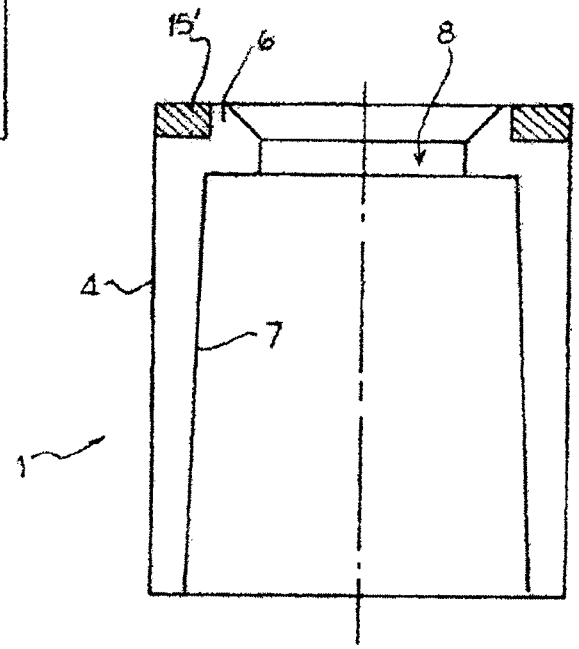
FIG. 4A
FIG. 4B

END PROTECTOR DEVICE FOR TUBULAR STRUCTURES

CROSS-REFERENCE TO RELATED APPLICATIONS

This application claims priority to Argentinean Patent Application No. P070103692.0, entitled "AN END PROTECTOR DEVICE FOR TUBULAR GOODS (T) PREFERABLY TUBES FOR THE OIL INDUSTRY, OCTG, "LINE PIPES" AND SIMILAR", filed Aug. 21, 2007, the entirety of which is hereby incorporated by reference.

BACKGROUND

1. Field

Embodiments of the disclosure concern a protector device for tubular goods. More specifically, embodiments of the disclosure relate to a device to protect the ends of the tubes that are exposed to impact loads and require protection to avoid damage to threads or bevels of the tubular goods. Particular applications for the end protector device are for tubes for the oil industry, OCTG, and line pipes.

2. Description of the Related Art

The petroleum and natural gas industries routinely employ tubular pipes for the transportation of petroleum and natural gas. Problematically, however, such pipes may become damaged during shipping and/or handling. For example, if a pipe contacts another object with sufficient force, the pipe may deform, crack, or both. Such damage may render the pipe unsuitable for its intended application, due to a change in geometry or inability to contain its contents without leaking.

To address these issues, tube protectors have been developed to protect tubes from impact damage. However, in the case of pipes having Product Specification Level (PSL) PSL-2 and PSL-3, most tube protectors available in the market do not meet the impact resistance requirements stated in ISO rule 11960, Annex I, "Petroleum and natural gas industries—Steel pipes for use as casing or tubing for wells", concerning technical delivery conditions for steel pipes.

ISO rule 11960 defines two different impact tests, an axial test using an iron rod of 1.5 inches as indenter and another test that uses a level contact surface, on which a load is applied at about 45° from the tube direction. Both tests are very demanding and most thread protectors in the market do not comply with these tests satisfactorily. For example, the tubes for the oil industry, or OCTG tubes, and line pipes, are huge steel masses. In circumstances where tubes such as these are in motion, impact with other objects causes damage to the ends of the pipes. In most of these cases, the objects are comparable to the steel rods of 1.5 inches employed in ISO rule 11960. Thus, damage to the ends of the tube might be inhibited if the tube or the other object deflects to avoid the impact. These characteristics have not been found in any known thread protector, or in any other comparable goods.

SUMMARY

Embodiments of the present disclosure provide a protector device for the ends of the tubular goods. Examples of the tubular goods may include, but are not limited to, tubes for the oil industry, OCTG, line pipes, and the like. In one embodiment, the protector device may comprise a generally elongate protector body and a bumper reinforcement that may be reversibly connected or fastened to the protector body. The protector body may be configured in a cylindrical geometry having an open first end (which may also be considered a lower end) and a second end (which may also be considered an upper end) interconnected by lateral walls and defining a socket. The second end of the body may further comprise a shoulder or perimetral edge and an opening. The protector body defines a socket in which a tubular good may be inserted that extends from about the open first end to about the shoulder. The bumper reinforcement reversibly connects or fastens to the protector body, holding on the protector body by its second or upper end, and includes an external curved or conical surface, capable of deforming in reaction to an external force in order to protect an enclosed tubular good.

In one embodiment, an end protector comprises a protector body and a bumper reinforcement. The protector body has an open first end and a second end interconnected by lateral walls, where the second end of the protector body further comprises an opening and a perimetral edge, and the protector body defines a socket for receipt of a tubular good. The bumper reinforcement has an external surface configured in a curved or conical geometry and is capable of deformation. The bumper reinforcement is further configured to be able to fasten to the second end of the protector body through a fastening mechanism.

In certain embodiments, the lateral walls of the protector body taper inward from the first end towards the second end of said protector body within the cavity.

In further embodiments, the fastening mechanism comprises a flange of the bumper reinforcement configured to interconnect with the shoulder or perimetral edge of said protector body when the flange is inserted within the socket in order to inhibit removal of the bumper reinforcement from the protector body. In alternative embodiments, the fastening mechanism comprises at least one of complementary threads configured within the protector body and bumper reinforcement, clinch nails, rivets, screws, straps, and locks that extend between the protector body and bumper reinforcement.

In additional embodiments, the bumper reinforcement comprises a cavity where the fastening mechanism comprises friction arising between an external surface of the protector body and the interior walls of the bumper reinforcement cavity when at least an end of the protector body is inserted within the bumper reinforcement cavity. The bumper reinforcement and protector body may further comprise a plurality of complementary recesses and projections positioned on the external surface of the protector body and the interior walls of the bumper reinforcement cavity configured for frictional engagement.

In other embodiments, the first end of the protector body comprises a first groove containing a first elastomeric seal ring within the socket. In further embodiments, the perimetral edge of said protector body further comprises a second groove containing a second elastomeric seal ring.

In an embodiment of the end protector device, the internal walls of the socket of the protector body are complementarily threaded with respect to the threaded ends of a tubular good so as to enable threaded engagement between the protector body and the tubular good.

In additional embodiments, the protector body and bumper reinforcement comprise one of a recyclable high density polyethylene (HDPE), polyethylene terephthalate (PET), polypropylene (PP), or a polyolefin. In other embodiments, the protector body and bumper reinforcement further comprise a reinforcement of at least one of fibers or glass spheres, carbon, and cellulose natural mesh. In further embodiments, the protector body further comprises at least one of polylactic acid (PLA) or polyhydroxybutyrate (PHB) biodegradable aggregates.

In further embodiments, the protector body may comprise at least one reinforcement ring that improves the resistance of the protector body to the impact. The at least one reinforcement ring may be metallic. In alternative embodiments, the at least one reinforcement ring is positioned adjacent the perimetral edge. In other embodiments, the protector body includes a first reinforcement ring that abuts the inner walls of the protector body and a second reinforcement ring that abuts the outer surface of the protector body.

In additional embodiments, the curved external surface of said bumper reinforcement has the form of an ellipse, revolution parabola, hyperbola, or hemisphere.

In further embodiments the bumper reinforcement comprises a metallic material. In other embodiments, the bumper reinforcement is transparent to allow the visual inspection of the elements inside the tubular good.

Further embodiments of the present disclosure provide methods for protecting a tubular good utilizing end protectors as described above. Such methods may be utilized to protect the threads or bevels of tubular goods. In one embodiment, the protector body is applied directly in contact with an end of the tubular good. If the tubular good end is threaded, the protector body may be threaded to the tubular good. The bumper reinforcement is then applied to the protector body, in other words, after the protector body is applied to the tubular body. The fastening of the protector or bumper reinforcement to the protector body could even be carried out without the protector or bumper reinforcement getting in contact with the tubular element.

Additional embodiments of the present disclosure provide systems for the protection of tubular goods. The system comprises a tubular good having a first end and a second end. The system further comprises a protector body having a first end and a second end, where the protector body defines a socket. In an embodiment, the first end of the protector body receives one of the first or second ends of the tubular good within the socket. The protection system further comprises a bumper reinforcement having an external surface configured in a curved or conical geometry. In certain embodiments, the bumper reinforcement is mounted to the protector body so as to protect the end of the tubular good received by the protector body.

BRIEF DESCRIPTION OF THE DRAWINGS

FIG. 3 illustrates an embodiment of a protector body of the end protector device that includes elastomeric seal rings in a region of the perimetral edge or shoulder and in the region of the lower end of the protector body; and FIGS. 4A and 4B illustrate an embodiment of the protector body including reinforcement rings.

DETAILED DESCRIPTION

Figure 1A:
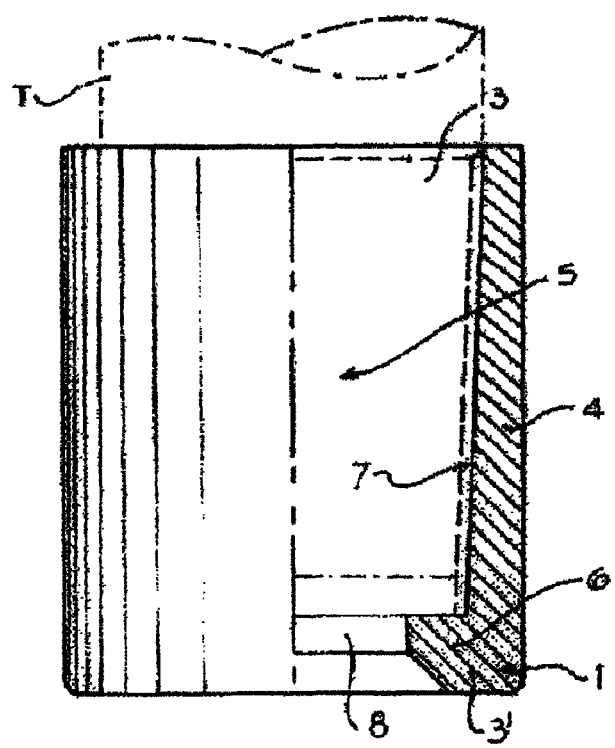
FIGS. 1A and 1B schematically illustrate one embodiment of an end protector device of the present disclosure.

Embodiments of the present disclosure present devices for the protection of the ends of the tubular goods, such as pipes. The end protector devices comprise a first piece, or protector body, that is configured to contact the end of the tubular goods. For example, the protector body may be threaded to the tubular good in the case that the end of the tubular good is threaded. The end protector device further comprises a second piece, also referred to as a protector or bumper reinforcement, that is configured for attachment to the protector body. In use, the protector body is mounted to the tubular good and the protector or bumper reinforcement is attached to the protector body, thus mounting the bumper reinforcement to the tubular goods. In further embodiments, attachment of the protector or bumper reinforcement to the protector body may be carried out without the protector or bumper reinforcement contacting the tubular good. In additional embodiments, the end protector device may further comprise elastomeric seals for the protection of seals and bevels of the tubular good from liquids.

Beneficially, a tubular good or pipe configured with the end protector device of the present disclosure may be protected from damage to its ends. For example, when a pipe installed with the end protector device is contacted with another object at the end of the pipe, the end protector may deflect the load on the ends.

The end protector device is configured in two pieces, considering the great volumes that the device might take up if it were configured in one piece, as well as the fact that a usual installation and removal of the current thread protectors is carried out using tools that would not be used if it had been developed in only one semispherical piece. In light of the many procedures that are performed in a factory with tubular goods, the end protection device provides significant improvements over the ordinary thread protectors, both open or closed, given that it is made up of two pieces. The protector body may act as an open thread protector for maneuvering, while the bumper reinforcement acts as a reinforcement cap that provides resistance to impact.

The end protector also provides a number of additional advantages. In one aspect, the end protector is designed such that the protector body is configured for attachment of the protector or bumper reinforcement. In another aspect, the end protector provides at least a selected resistance to impact, enabling the manipulation of the tubular goods inside the factory while inhibiting damage to protected tubular goods. In a further aspect, when configured with elastomeric seals, the elastomeric seals may provide a seal for the threads and bevels of the tubular goods, inhibiting fluids from contacting the threads and/or bevels of the tubular good during the transport and/or storage, besides the protection compound, which is usually used and is applied in the factory.

Embodiments of the present disclosure are discussed with respect to tube ends of pipes for the oil industry, in order to avoid damage to the threads and/or to the bevels of the tube. However, it may be understood that the disclosed embodiments can also be applied to any tubular goods for protection.

Figure 1B:
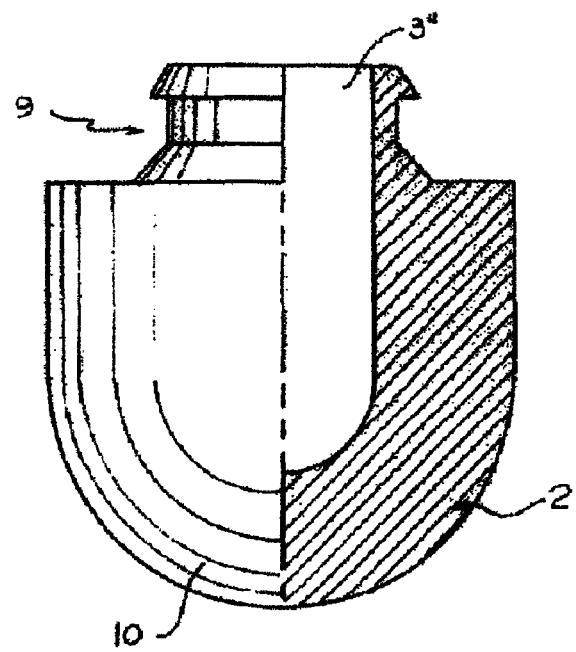

FIGS. 1A and 1B illustrate an embodiment of a protector device for the ends of the tubular goods T. The edge protector device may comprise two pieces, a first piece or protector body 1 (FIG. 1A) and a second piece or protector or bumper reinforcement 2 (FIG. 1B).

The protector body 1 comprises an open first end 3, lateral walls 4, and a second end 3'. The second end 3' may comprise a perimetral edge or shoulder 6 which can have a thickness greater than the lateral walls 4. The protector body 1 may further comprise an opening 8, defining a socket 5 of internal walls 7. The internal walls 7, in certain embodiments, may narrow from the first end 3 towards the second end 3' of the protector body 1.

Configured in this manner, the protector body 1 may be inserted onto the end of the tubular good T and fixed in place. In one embodiment, the internal walls 7 may possess threads to fix the protector body 1 in place. In the case of being threaded, the threads of the narrowed internal walls 7 of the socket 5 may be complementary to threads present at about the ends of the tubular goods T.

In alternative embodiments, the protector body 1 may be dimensioned with respect to the tubular good T so as to allow fixation of the protector body 1 with respect to the tubular good by pressure or friction alone. Furthermore, the protector or bumper reinforcement 2 can also be fastened to the protector body 1 by the external surface E of the protector body 1, that inserts itself inside a cavity 13 defined by the protector or bumper reinforcement 2 (see FIGS. 2A and 2B). As discussed below, fastening mechanisms such as rivets, cotter pins, screws, bolts, and the like may also be employed to secure the protector or bumper reinforcement 2 to the protector body 1.

The protector body 1 may comprise a high recyclability plastic material, such as HDPE (high density polyethylene), PET (polyethylene terephthalate), PP (polypropylene), and the like. The plastic material may further comprise oxobiodegradeable aggregates, such as PLA (polylactic acid), PHB (hydroxybutyrate), and the like.

In further embodiments, the protector body material may be selected so as to possess durability so as to be able to provide adequate mechanical protection to the ends of the tubular goods for at least two years. For example, the long term durability of the protector body material may be evaluated through accelerated tests of about 2000 hours of exposure in a UV chamber according to ASTM G154, such as cycle 7 of the table x2.1. Alternatively or in addition to this test, long term durability may be evaluated by about 750 hours of exposure in a wet saline environment in a chamber according to ASTM B117.

In additional embodiments, the thickness of the protector body 1 may be varied. In one example, the internal diameter of the protector body 1 may be varied according to the diameter of the tubular goods T to which it is applied, while keeping the outer diameter of the protector body approximately constant, in order to accommodate the diameter of the tubular goods. In another example, the protector body 1 may be configured such that its thickness is as thin as possible, particularly in the thread region, in order to avoid effects due to material expansion, such as thermal expansion. Thus, the thickness of the protector body 1 between the lateral walls 4 and the internal walls 7, may be configured to be low enough to inhibit the development of large stresses due to material expansion, generally high recyclability or biodegradability plastic, as already mentioned above. In other embodiments, the thickness of the protector body 1 may be balanced with the impact resistance of the protector body, which increases with the thickness.

Based on the above-mentioned factors, the reduction of the protector body thickness to reduce contraction stresses when it is used in low temperatures has not been disclosed, nor suggested, or taught by previous designs, nor the use of biodegradable polymers for the protector body, or the protector or bumper reinforcement 2.

The protector body 1 may optionally include one or more grooves containing an elastomeric seal. In one embodiment as illustrated in FIG. 3, a groove H1 containing an elastomeric seal may be located adjacent the shoulder 6 of the protector body 1. In another embodiment, a groove H2 containing an elastomeric seal may be positioned adjacent the first end 3 of the protector body 1. The elastomeric seal may comprise a low-elastic modulus material, which may distort itself when placed in contact with the tubular goods T. In this manner, a seal may be achieved between a portion of the tubular goods T that comes in contact with the shoulder 6 or the first end of the protector body 1.

The protector body 1 may further include reinforcement rings 15, as illustrated in the embodiments of FIGS. 4A and 4B, to enhance the mechanical durability of the end protector device. In one embodiment, the reinforcement rings 15 may abut the inner walls 7 of the protector body 1, adjacent the shoulder 6 of the protector body 1. In an alternative embodiment, the reinforcement rings 15 may abut the outer surface of the protector body 1, adjacent the shoulder 6 of the protector body 1.

The reinforcement rings 15 may be formed of a mechanically resilient material. For example, the rings 15 may be formed of a polymer possessing relatively high values of elastic modulus and tenacity. In alternative embodiments, the reinforcement rings 15 may be metallic, if they are not in contact with the tubular good T. Employing the reinforcement rings 15 in this manner, the resistance to impact of the protector body 1 may be improved, while at the same time allowing the thickness for the protector body 1 to be maintained at a relatively low value. In the cases where there is significant maneuvering of tubular goods T in the factory, the resistance to the impact provided by the protector body 1 may satisfy the levels required by the USO 11960 rule using reinforcement rings. In further benefit, such a configuration of the protector body 1 may demonstrate good mechanical durability while inhibiting the formation of potentially detrimental thermal expansion stresses.

Figure 2A:
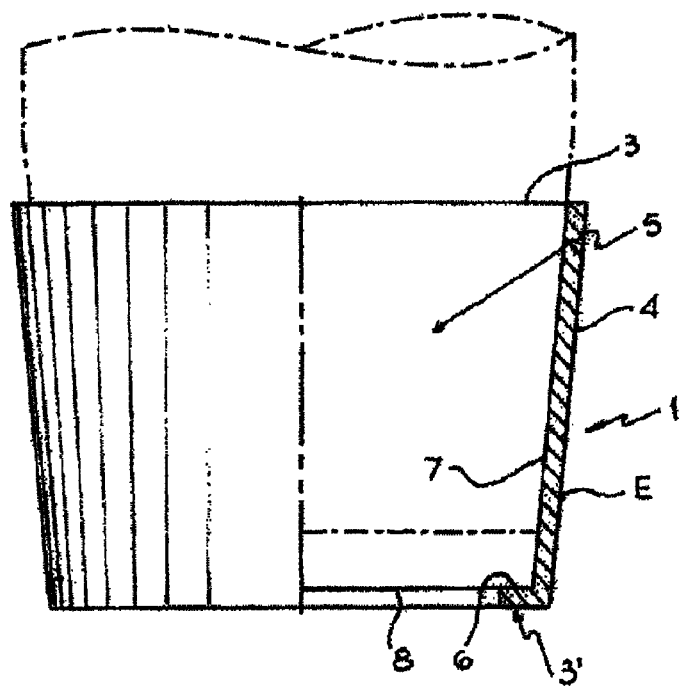
FIGS. 2A and 2B schematically illustrate an alternative embodiment of an end protector device of the present disclosure including a protector or bumper reinforcement of conical geometry.
Figure 2B:
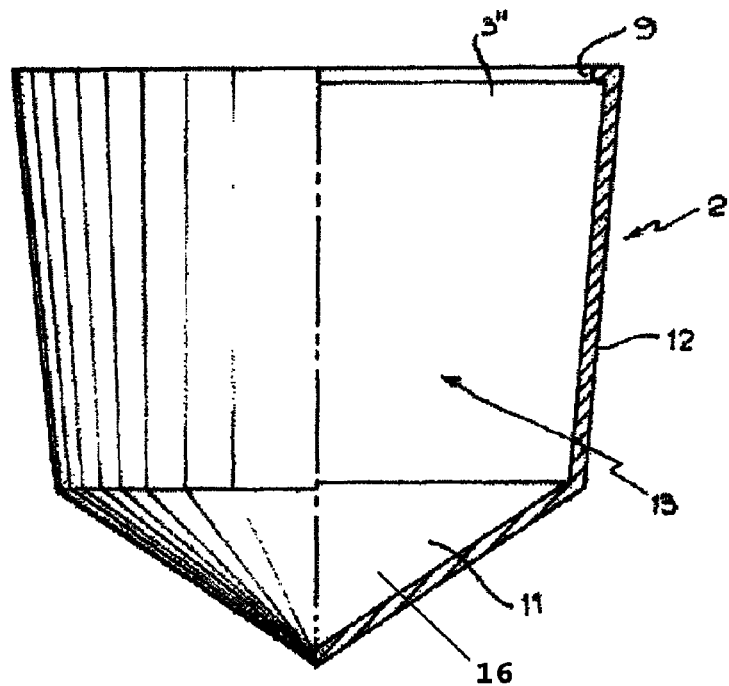

FIGS. 1B and 2B further illustrate embodiments of the protector or bumper reinforcement 2. In one embodiment, the bumper reinforcement 2 is configured to enable the end protection device to comply with the resistance to impact specified in ISO 11960, Annex I. In another embodiment, the bumper reinforcement 2 is configured to deflect incident impact loads in order to avoid damages to the ends of the tubular goods T to which the protection device is mounted and to the device itself. In an additional embodiment, the bumper reinforcement 2 is configured to occlude one or more ends of tubular goods T in order to avoid the entrance of objects once the device is mounted to the tubular goods T.

The protector or bumper reinforcement 2 may be fabricated from a plastic or metallic material. In embodiments where the bumper reinforcement 2 is formed from a plastic material, the plastic may be selected to exhibit high recyclability, such as in the case of HDPE, PET or PP. In further embodiments, the plastic may further include reinforcements, such as at least one of fibers, glass spheres, carbon, cellulose natural mesh, or the like. In other embodiments, the plastic material may further comprise PLA or PHB oxobiodegradable aggregates.

As in the case of the protector body 1, the material from which the bumper reinforcement 2 is fabricated may be configured to provide an adequate protection to the ends of the tubular goods for at least two years. For example, the protection ability of the bumper reinforcement material when exposed to UV light may be examined through accelerated tests of about 2000 hours of exposure in a UV chamber according to the ASTM G154, cycle 7 of the table x2.1. In another example, the protection ability of the bumper reinforcement material to wet saline environments may be examined by about 750 hours of exposure in a wet saline environment in a chamber according to ASTM B117.

The geometry of an external surface 11 of the bumper reinforcement 2 may also be varied. In certain embodiments, the bumper reinforcement 2 may possess a conical or curved external surface 11 (FIG. 2B), such as a revolution parabola or hyperbola (not illustrated). In other embodiments, the bumper reinforcement 2 may possess an external surface 11 comprising a hemisphere 10 (FIG. 1B). The characteristics of impact deflection may be imparted to the end protection device due to these geometries. In addition, these geometries may impart a high compression resistance to the end protection device, higher than that provided in cylindrical protectors in common thread protectors.

FIGS. 2A and 2B depict an embodiment of the edge protection device having an external conical surface. In certain embodiments, the thickness between the lateral walls 4 and the narrowed internal walls 7 of the protector body 1 are approximately constant. The metallic and conical protector or bumper is interconnected to the lateral walls 4.

In one embodiment, FIG. 2B, the bumper reinforcement 2 may be attached to the protector body 1 by pressure and locks on the protector body 1. The bumper reinforcement 2 may be positioned over the protector body 1 by insertion of the protector body 1 within a first conical cavity 13. The lateral walls 12 of the bumper reinforcement 2 may be configured with approximately the same conicity as the lateral walls 4 of the protector body 1, and thus provide the first conical cavity 13 with approximately the same conicity as the lateral walls 4 of the protector body. As such, when the protector body 1 reaches its final position within the first conical cavity 13, at least a portion of the lateral walls 4 may contact the lateral walls 12 of the bumper reinforcement 2, frictionally locking the protector body 1 in place with respect to the bumper reinforcement 2.

It may be further observed that the bumper reinforcement 2 further comprises a second conical cavity 16 of greater conicity than the first conical cavity 13, allowing the bumper reinforcement to deflect applied loads.

In another embodiment, the bumper reinforcement 2 may be curved. In the curved case, the bumper reinforcement 2 may adopt the form of an ellipse, revolution parabola, hyperbola, or hemisphere. Beneficially, any of these geometries may demonstrate the impact deflection load characteristics and mechanical resistance desired for the edge protector.

Securing the protector or bumper reinforcement 2 to the protector body 1 may be accomplished through a fastening mechanism. In one embodiment, a fastening mechanism 9 of the bumper reinforcement 2, such as a flange, may be inserted within an opening 8 of the perimetral edge or shoulder 6 of the protector body 1. The fastening mechanism 9 so positioned may engage with the shoulder 6 and inhibit removal of the bumper reinforcement 2 from the protector body.

In alternative embodiments, the bumper reinforcement 2 may be frictionally coupled to the external surface of the protector body 1, as discussed above with respect to FIGS. 2A and 2B. In further embodiments, frictional contact between recesses and projections in the protector body 1 and in the protector or bumper reinforcement 2, may inhibit removal of the bumper reinforcement 2 from the protector body 1 once the body 1 is inserted within the conical cavity 13. It may be understood that any combination of setbacks and protuberances may be incorporated into either or both of the bumper reinforcement 2 and protector body 1 to accomplish such frictional coupling.

Alternatively, a fastener device may be employed to mechanically inhibit movement of the bumper reinforcement 2 with respect to the protector body 1 once the two are joined. For example, a fastener device such as one or more screws, rivets, cotter pins, screws, bolts, and the like, may be inserted into the edge protection device so as to extend from the bumper reinforcement 2 to the protector body 1, within the region of the device where the bumper reinforcement 2 and protector body 1 overlap. Such a fastener device may be configured to inhibit at least one of rotation and translation of bumper reinforcement 2 and protector body with respect to one another.

In other embodiments, the upper end 3' of the protector body 1 may include a perimetral edge or "shoulder" 6 and an opening 8, through which a fastening mechanism 9 can enter so as to fasten the protector reinforcement 2 to the protector body 1.

In summary, embodiments of the present disclosure provide protector devices for the ends of the tubular goods, such as tubes for the oil industry, OCTG, line pipes and the like. In one embodiment, the edge protector comprises a protector body 1 that comprises an open first end 3, lateral walls 4, and a second end 3' having a perimetral edge or shoulder 6, and an opening. The protector body defines a socket 5 in which the end for a tubular good T may be inserted.

The edge protector further comprises a second piece, a protector or bumper reinforcement 2 having an external curved or conical surface. The bumper reinforcement 2 is configured to interconnect with the protector body 1 at about the second end 3' using a fastening mechanism. The geometry and material composition of the bumper reinforcement 2 is configured so as to allow the bumper reinforcement 2 to deform.

In this manner, the edge protection device may protect the ends of tubular goods and comply with the resistance to an impact, such as the requirements imposed by ISO 11960. Furthermore, the edge protection device may also enable impact loads associated with high energy axial impacts to be deflected, avoiding damage to the ends of the tubular goods T and reducing the damages to the device itself.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. An end protector device for tubular goods, comprising:
   a protector body having an open first end and a second end interconnected by a continuous circumferential lateral wall and defining a socket extending along a longitudinal axis for receiving a tubular good, wherein the lateral wall tapers linearly inward from the first end towards the second end of said protector body, and wherein the second end is at the distal-most end of the protector body and further comprises an opening and a perimetral edge; and
   a bumper reinforcement having an external surface configured in a curved or conical geometry that extends from a distal-most end of the bumper that intersects the longitudinal axis toward a proximal end of the bumper, wherein the bumper reinforcement is in contact with the second end of the protector body through a fastening mechanism, a distal end of the bumper reinforcement being substantially closed.

2. The end protector device according to claim 1, wherein said fastening mechanism comprises a flange of the bumper reinforcement configured to interconnect with the perimetral edge of said protector body when the flange is inserted within the opening of the second end.

3. The end protector device according to claim 1, wherein the bumper reinforcement comprises a cavity and wherein the fastening mechanism comprises friction arising between an external surface of the protector body and an interior wall of the bumper reinforcement cavity when at least a portion of the protector body is inserted within the bumper reinforcement cavity.

4. The end protector device according to claim 3, wherein the protector body and bumper reinforcement comprise a plurality of complementary recesses and projections positioned on the external surface of the protector body and the interior wall of the bumper reinforcement cavity are configured for frictional engagement.

5. The end protector device according to claim 1, wherein the fastening mechanism comprises at least one of complementary threads configured within the protector body and bumper reinforcement, clinch nails, rivets, screws, straps, and locks that extend between the protector body and bumper reinforcement.

6. The end protector device according to claim 1, wherein the first end of said protector body further comprises a first groove containing a first elastomeric seal ring within the socket.

7. The end protector device according to claim 1, wherein the perimetral edge of said protector body further comprises a second groove containing a second elastomeric seal ring.

8. The end protector device according to claim 1, wherein an internal wall of the socket of the protector body is complementarily threaded with respect to a threaded end of the tubular good so as to enable threaded engagement between the protector body and the tubular good.

9. The end protector device according to claim 1, wherein said protector body comprises one of a recyclable high density polyethylene (HDPE), polyethylene terepthalate (PET), polypropylene (PP), or a polyolefin.

10. The end protector device according to claim 9, wherein said protector body further comprises a reinforcement of at least one of fibers or glass spheres, carbon, and cellulose natural mesh.

11. The end protector device according to claim 9, wherein said protector body further comprises at least one of polylactic acid (PLA) or polyhydroxybutyrate (PHB) biodegradable aggregates.

12. The end protector device according to claim 1, wherein said protector body further comprises at least one reinforcement ring that improves the resistance of the protector body to impact.

13. The end protector device according to claim 12, wherein said at least one reinforcement ring is metallic.

14. The end protector device according to claim 12, wherein said at least one reinforcement ring is positioned adjacent the perimetral edge.

15. The end protector device according to claim 12, wherein said protector body includes a first reinforcement ring that abuts the inner wall of the protector body and a second reinforcement ring that abuts the outer surface of the protector body.

16. The end protector device according to claim 1, wherein said bumper reinforcement comprises a plastic or metallic material.

17. The end protector device according to claim 16, wherein the bumper reinforcement comprises one of a recyclable high density polyethylene (HDPE), polyethylene terepthalate (PET), polypropylene (PP), or a polyolefin.

18. The end protector device according to claim 1, wherein the curved external surface of said bumper reinforcement has the form of an ellipse, revolution parabola, hyperbola, or hemisphere.

19. The end protector device according to claim 1, wherein said bumper reinforcement is transparent to allow the visual inspection of elements inside said tubular good.

20. The end protector device of claim 1, wherein the distal-most end of the bumper is disposed distally of the protector body.

21. A method of protecting a tubular body, comprising:
applying a protector body to an end of a tubular body, the protector body having an open first end to receive the end of the tubular body, a second end interconnected with the first end by a continuous circumferential lateral wall, the protector body extending along a longitudinal axis; and
applying a bumper reinforcement having a fastening mechanism to the protector body such that the bumper is spaced apart from the tubular body, the bumper reinforcement having an external surface at a closed distal end thereof configured in a curved or conical geometry that extends from a distal-most end of the bumper that intersects the longitudinal axis toward a proximal end of the bumper, the fastening mechanism comprising a flange configured to interconnect the bumper reinforcement and protector body such that the bumper reinforcement contacts a perimetral edge of the second end of the protector body.

22. A protection system for tubular goods, comprising:
a tubular good having a first end, a second end, and extending along a longitudinal axis;
a protector body having a first end and a second end, wherein the protector body defines a continuous circumferential socket and wherein the first end of the protector body receives one of the first or second ends of the tubular good within the socket and wherein the second end defines a substantially uninterrupted circumferential edge and an opening; and
a bumper reinforcement having an external surface configured in a curved or conical geometry that extends from a distal-most end of the bumper that intersects the longitudinal axis toward a proximal end of the bumper, wherein the bumper reinforcement does not contact the tubular good and is mounted to the protector body through a fastening mechanism comprising a flange inserted within the opening of the second end of the protector body such that the external surface extends over the longitudinal axis of the tubular good so as to protect the end of the tubular good received by the protector body.

23. The protection system of claim 22, wherein the distal-most end of the bumper is disposed distally of the protector body.

* * * * *